United States Patent
Jain et al.

(10) Patent No.: US 12,253,940 B2
(45) Date of Patent: Mar. 18, 2025

(54) DATA STORAGE DEVICE AND METHOD FOR RESPONDING TO A HOST-SPECIFIED PARAMETER OF AN UPCOMING BURST MODE

(71) Applicant: Western Digital Technologies, Inc., San Jose, CA (US)

(72) Inventors: Ronak Jain, Karnataka (IN); Rohit Prasad, Karnataka (IN); Ramanathan Muthiah, Karnataka (IN)

(73) Assignee: Sandisk Technologies, Inc., Milpitas, CA (US)

( * ) Notice: Subject to any disclaimer, the term of this patent is extended or adjusted under 35 U.S.C. 154(b) by 76 days.

(21) Appl. No.: 17/686,620

(22) Filed: Mar. 4, 2022

(65) Prior Publication Data

US 2023/0281122 A1    Sep. 7, 2023

(51) Int. Cl.
  *G06F 12/02*    (2006.01)
  *G06F 3/06*     (2006.01)

(52) U.S. Cl.
  CPC ........ *G06F 12/0253* (2013.01); *G06F 3/0604* (2013.01); *G06F 3/0659* (2013.01); *G06F 3/0679* (2013.01); *G06F 2212/7205* (2013.01)

(58) Field of Classification Search
  None
  See application file for complete search history.

(56) References Cited

U.S. PATENT DOCUMENTS

| | | | |
|---|---|---|---|
| 8,626,986 B2 | 1/2014 | Wu et al. | |
| 9,348,749 B2 | 5/2016 | Choi et al. | |
| 10,229,049 B2 | 3/2019 | Hashimoto | |
| 10,977,173 B2 | 4/2021 | Li et al. | |
| 11,003,384 B2 | 5/2021 | Kale | |
| 11,586,578 B1* | 2/2023 | Dastidar | G06N 20/00 |
| 11,698,858 B2* | 7/2023 | De La Cerda | G06F 3/0679 |
| | | | 711/154 |
| 2005/0195635 A1* | 9/2005 | Conley | G06F 12/0866 |
| | | | 711/E12.019 |
| 2014/0281127 A1* | 9/2014 | Marcu | G06F 12/0238 |
| | | | 711/103 |
| 2017/0068451 A1* | 3/2017 | Kenan | G06F 3/0659 |
| 2019/0065367 A1* | 2/2019 | Li | G06F 12/0246 |
| 2019/0079787 A1* | 3/2019 | Toksoz | G06F 9/45504 |
| 2020/0133898 A1* | 4/2020 | Therene | G06N 5/04 |
| 2020/0225857 A1* | 7/2020 | Tarango | G06F 3/0629 |
| 2021/0406168 A1* | 12/2021 | Cariello | G06F 12/0253 |

* cited by examiner

*Primary Examiner* — Rocio Del Mar Perez-Velez
*Assistant Examiner* — Marwan Ayash
(74) *Attorney, Agent, or Firm* — Crowell & Moring LLP (57) ABSTRACT

A data storage device and method for host-determined proactive block clearance are provided. In one embodiment, a data storage device is provided comprising a memory and a controller. The controller is configured to receive a command from a host that specifies a parameter of an upcoming burst mode; and in response to receiving the command, proactively perform a garbage collection operation according to the parameter to create available storage space in the memory to store data from the host during the upcoming burst mode. Other embodiments are possible, and each of the embodiments can be used alone or together in combination.

18 Claims, 7 Drawing Sheets

DATA STORAGE DEVICE AND METHOD FOR RESPONDING TO A HOST-SPECIFIED PARAMETER OF AN UPCOMING BURST MODE

BACKGROUND

A data storage device can be used to store data sent from a host. During "burst mode," the data storage device stores data received from the host in single-level cell (SLC) memory instead of multi-level cell (MLC) memory, as SLC memory can be programmed faster than MLC memory. This allows the data storage device to keep pace with the rate at which data is being received from the host. To further assist in keeping pace, the data storage device can forego garbage collection while operating in burst mode.

DETAILED DESCRIPTION

Overview

By way of introduction, the below embodiments relate to a data storage device and method for host-determined proactive block clearance. In one embodiment, a data storage device is provided comprising a memory and a controller. The controller is configured to receive a command from a host that specifies a parameter of an upcoming burst mode; and in response to receiving the command, proactively perform a garbage collection operation according to the parameter to create available storage space in the memory to store data from the host during the upcoming burst mode.

In some embodiments, the parameter comprises a length of time of the upcoming burst mode; and the controller is further configured to convert the length of time into an amount of available storage space that needs to be created.

In some embodiments, the parameter specifies an amount of available storage space that needs to be created.

In some embodiments, power to the data storage device is guaranteed by the host for an amount of time needed to proactively perform the garbage collection operation.

In some embodiments, the controller is further configured to proactively perform the garbage collection operation in response to determining that the memory does not have enough available space.

In some embodiments, the controller is further configured to clear a logical-to-physical address translation cache in the data storage device in response to receiving the command.

In some embodiments, the memory comprises a three-dimensional memory.

In another embodiment, a method is provided that is performed in a host in communication with a data storage device comprising a memory. The method comprises determining that the host will be requiring the data storage device to be placed in a burst mode; and prior to the data storage device being placed in the burst mode, sending a command to the data storage device to create available storage space in the memory for data to be stored during the burst mode.

In some embodiments, the command specifies a duration of time of the burst mode.

In some embodiments, the method further comprises determining the duration of time from a plurality of expected burst times from a plurality of applications running on the host.

In some embodiments, the method further comprises determining the duration of time from an application usage pattern.

In some embodiments, the duration of time comprises expected boot sequence time.

In some embodiments, the command specifies an amount of available storage space that needs to be created.

In some embodiments, the method further comprises calculating the amount of available storage space that needs to be created from a duration of time of the burst mode.

In some embodiments, the command is sent during a non-peak workload.

In some embodiments, the data storage device creates the available storage space by proactively performing a garbage collection operation.

In some embodiments, the method further comprises guaranteeing power is provided to the data storage device for an amount of time needed to create the available storage space.

In some embodiments, the method further comprises instructing the data storage device to clear its logical-to-physical address translation cache.

In some embodiments, the command is sent prior to a transition from one stage to another stage in a game application.

In another embodiment, a data storage device is provided comprising: a memory; means for receiving a command from a host that specifies a parameter of an upcoming burst mode; and means for proactively performing a garbage collection operation according to the parameter in response to receiving the command.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
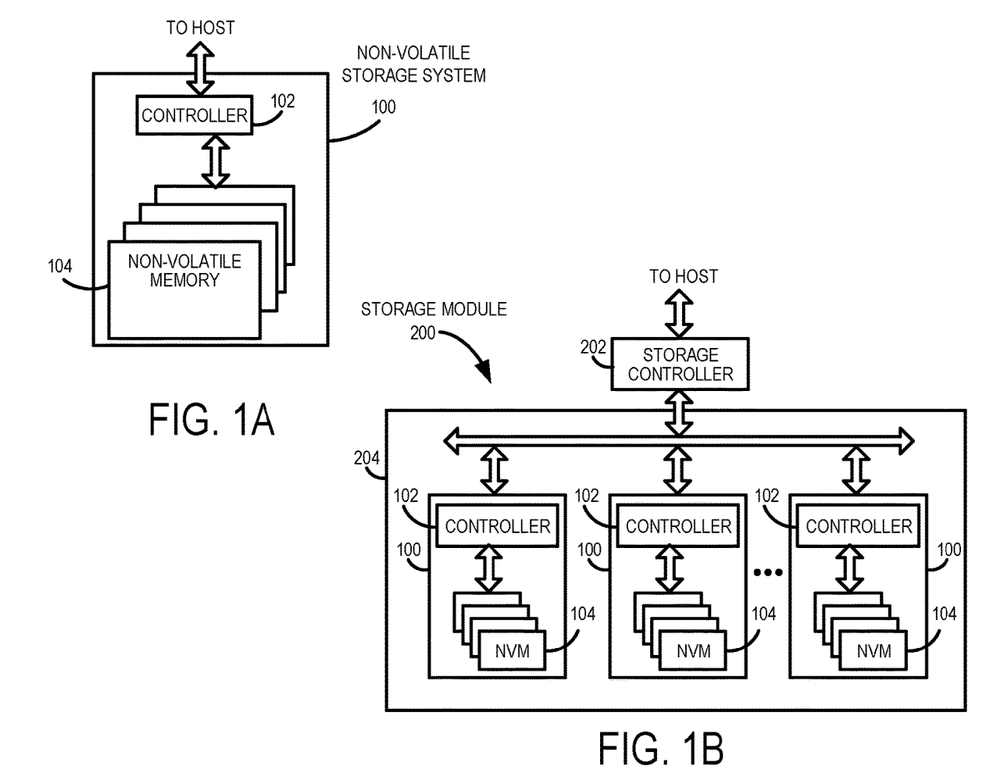
FIG. 1A is a block diagram of a data storage device of an embodiment.
FIG. 1B is a block diagram illustrating a storage module of an embodiment.
Figure 1C:
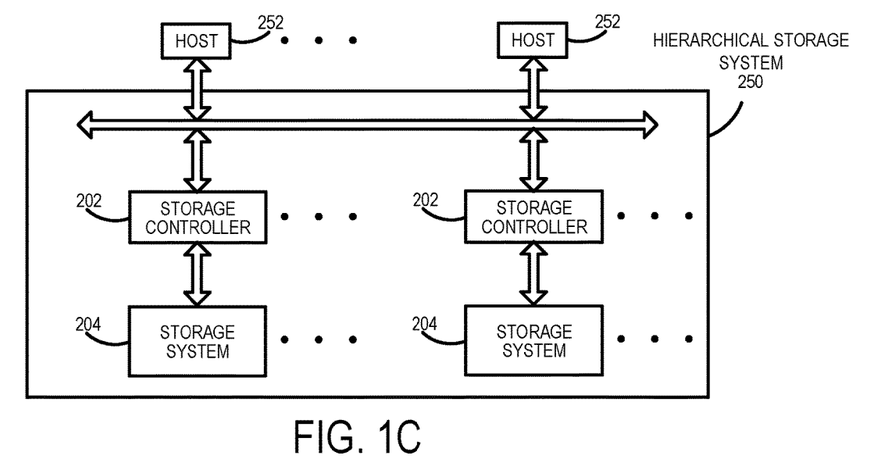
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
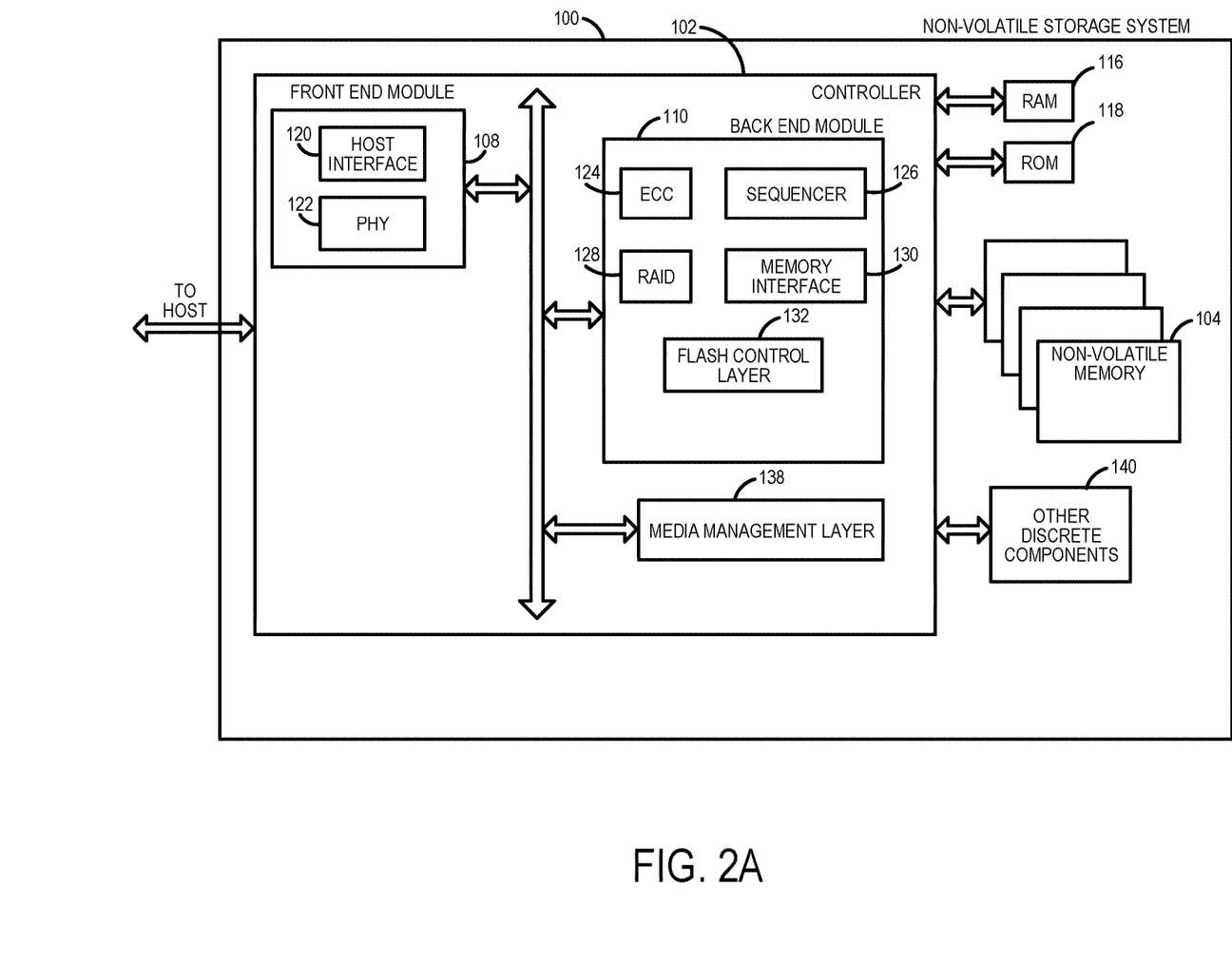
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
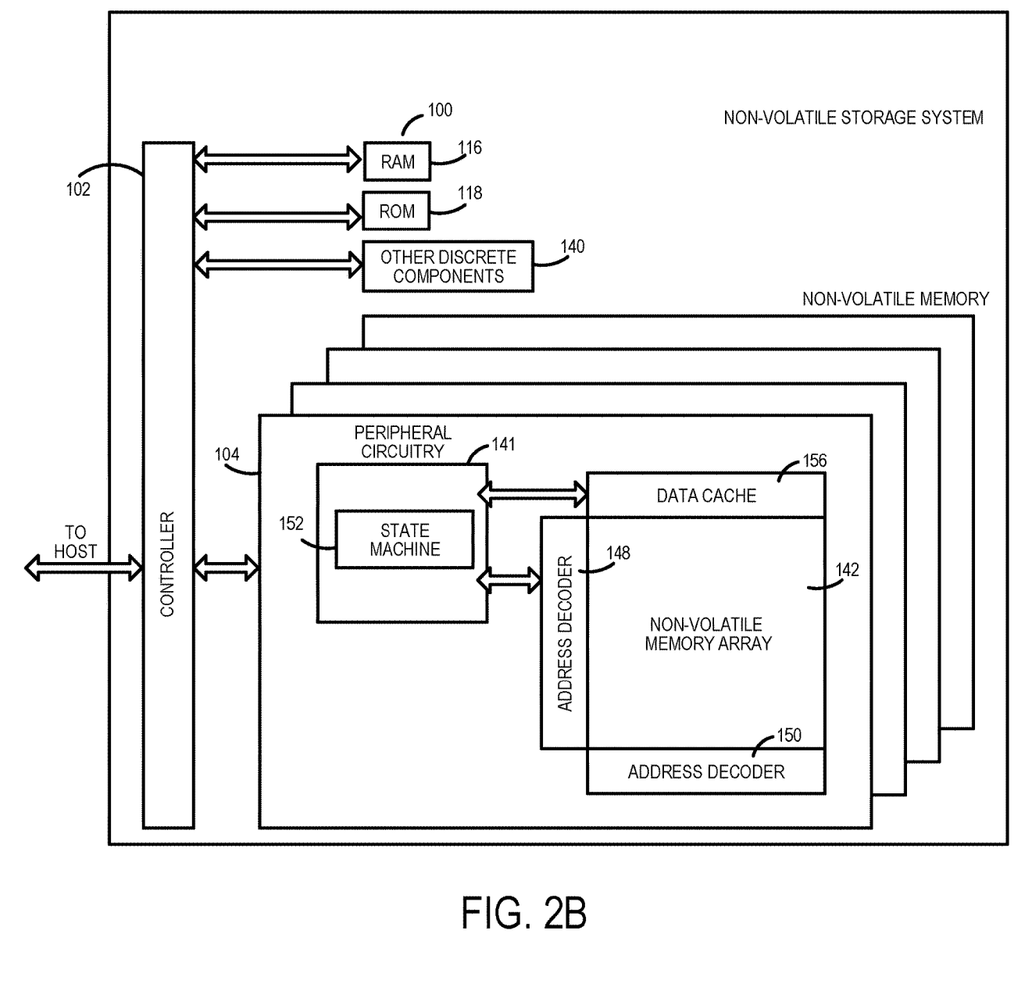
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
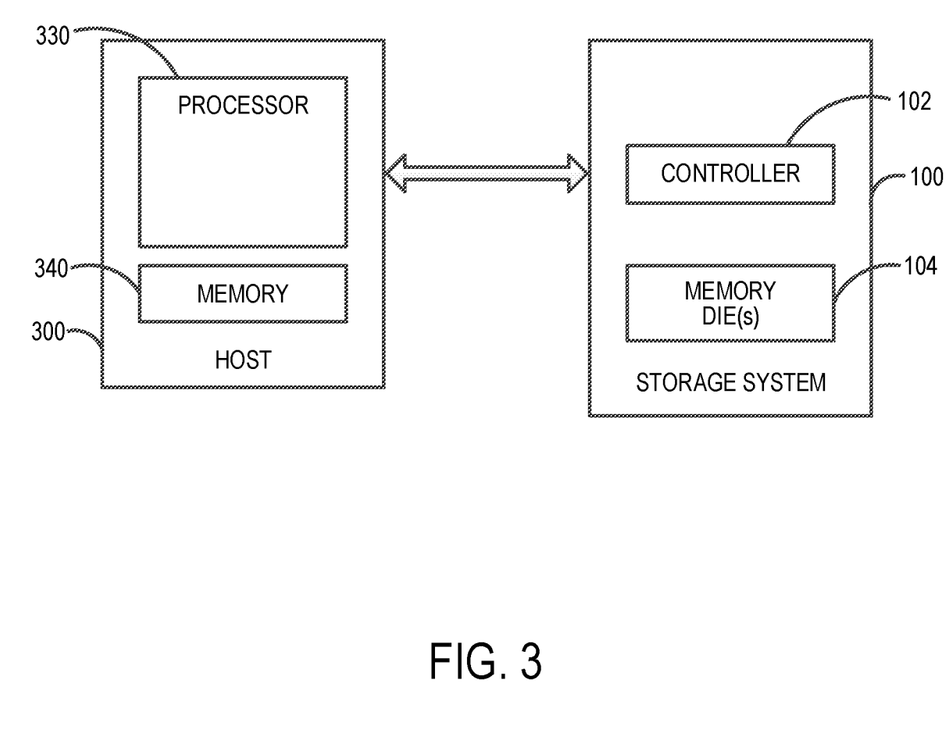
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

Garbage collection is backend work that is usually triggered when a free block count of a certain partition reaches a specific threshold and needs cleanup for the next batch of incoming data. Other backend operations can be performed. For example, wear levelling can be performed at regular intervals to maintain a uniform program-erase count (PEC)/wear indicator of all the blocks present in the data storage device 100. Also, read scrub can be performed at regular intervals (e.g., at random and deterministic physical locations) to correct and evacuate any high bit error rate (BER) data to a different location, preventing it from going to an unrecoverable bad state. Further, data in write-aborted or program-failure-affected blocks can be evacuated to a different block because there is a good chance that data residing in neighboring planes/wordlines will go bad.

The controller 102 of the data storage device 100 can be configured to forego garbage collection operations in certain situations, such as in burst mode. "Burst mode" typically refers to a mode of operation (usually set by the host 300) in which the data storage device 100 stores data received from the host 300 in single-level cell (SLC) memory instead of multi-level cell (MLC) memory, as SLC memory can be programmed faster than MLC memory. This allows the data storage device 100 to keep pace with the rate at which data is being received from the host 300. To further assist in keeping pace, the data storage device 100 can forego garbage collection while operating in burst mode. However, based on the data storage device's state machine, there may not be enough free blocks to perform the burst operation, especially when the data storage device 100 is worn out. So, foregoing garbage collection does not necessarily guarantee that the burst operation will be able to be performed by the data storage device 100.

The following embodiments can be used to address this situation. In one embodiment, the host 300 explicitly sends a block clearance (release) notice to the data storage device 100 (e.g., to trigger garbage collection) on determining (e.g., from its driver state machine) that an application on the host 300 will be performing an intensive input/output (I/O) operation for more than a threshold amount of bytes and/or time. The host 300 can send the notice/directive with a parameter indicating a number of bytes to clean up and/or a required burst time. Additionally, the host 300 can send this garbage collection trigger to the data storage device 100 based on a pre-communicated garbage collection workload of the data storage device to clear up burst memory blocks, a logical-to-physical (L2P) address translation cache, and other associated resources for its upcoming workload.

The host 300 can be configured to schedule any anticipated garbage collections in firmware proactively, so that when the application/host 300 wants to run an I/O-intensive application, a command (e.g., in a protocol-specific implementation) can be sent to the data storage device 100. When this command is processed, the data storage device 100 can schedule all anticipated garbage collections, if any, so that storage space is optimized (e.g., no partially-closed blocks, no empty burst buffers, uniformly worn-out blocks, etc.). As a result, the application/host 300 can be assured that there will be uniform input-output operations per second (IOPS) since there will be minimal or no garbage collection operations scheduled in the data storage device 100 for quite some time. This can be used for applications that require constant throughput or constant burst performance for a specified amount of time. On receiving a command that specifies burst time, the controller 102 of the data storage device 100 would determine the number of blocks needed for that time (by doing a time-to-storage space conversion) and then perform the garbage collection operations to clean up the determined number of blocks. Further, on receiving an explicit host directive, the data storage device 100 can clean up its L2P delta data, as well as flush its L2P caches to clean up the L2P space consistent with the upcoming workload.

Alternatively or additionally, the host 300 can perform the time-to-storage space conversion and provide the data storage device 100 with the needed number of blocks to clean up. In one embodiment, the host directive on block clearance/garbage collection can involve sending the data storage device 100 the number of burst blocks to be cleared (through clear up bytes or corresponding burst time) to enable the data storage device 100 to proactively know a target workload. Hence, the power to the data storage device 100 is guaranteed even if there are no further host read/write commands. This may be important to the clean-up task since typical device-determined clean up tasks, such as idle time garbage collection (ITGC) or background operations (BKOPS) do not have specific workload targets and, importantly, do not have a guarantee of power availability. The host 300 in the next burst write command can utilize the freed-up space (in SLC memory, usually for burst). The garbage collection directive guarantees such a burst mode of operation irrespective of device wear state.

These embodiments can also be used to dynamically tweak the burst range. For example, if the host 300 determines that the I/O burst requirement is beyond a time/byte threshold, it may trigger one or many host directives to the data storage device 100 with the appropriate clean-up byte parameters. Proactively sending this directive enables the data storage device 100 to set itself up for the task. The resulting garbage collection is not to be confused with the typical garbage collection of the data storage device 100, in which the data storage device 100 does as a part of block balancing towards cleaning up host blocks. For example, this directive, along with typical host writes, may clean up two portions of garbage collection resulting in more block clean up and, hence, momentary low performance, but setting the data storage device 100 up for subsequent intensive I/O operations. The data storage device 100 may further have other modified logics consistent with the proposed directive in moving hot data to garbage collection destination blocks (which may be more accommodative in moving hot data) since most of the architectures revolve around restricting the hot data movement during garbage collection. The design may also be construed as a device management technique since the host 300 clears up blocks when it determines a non-peak workload at its end.

Figure 4:
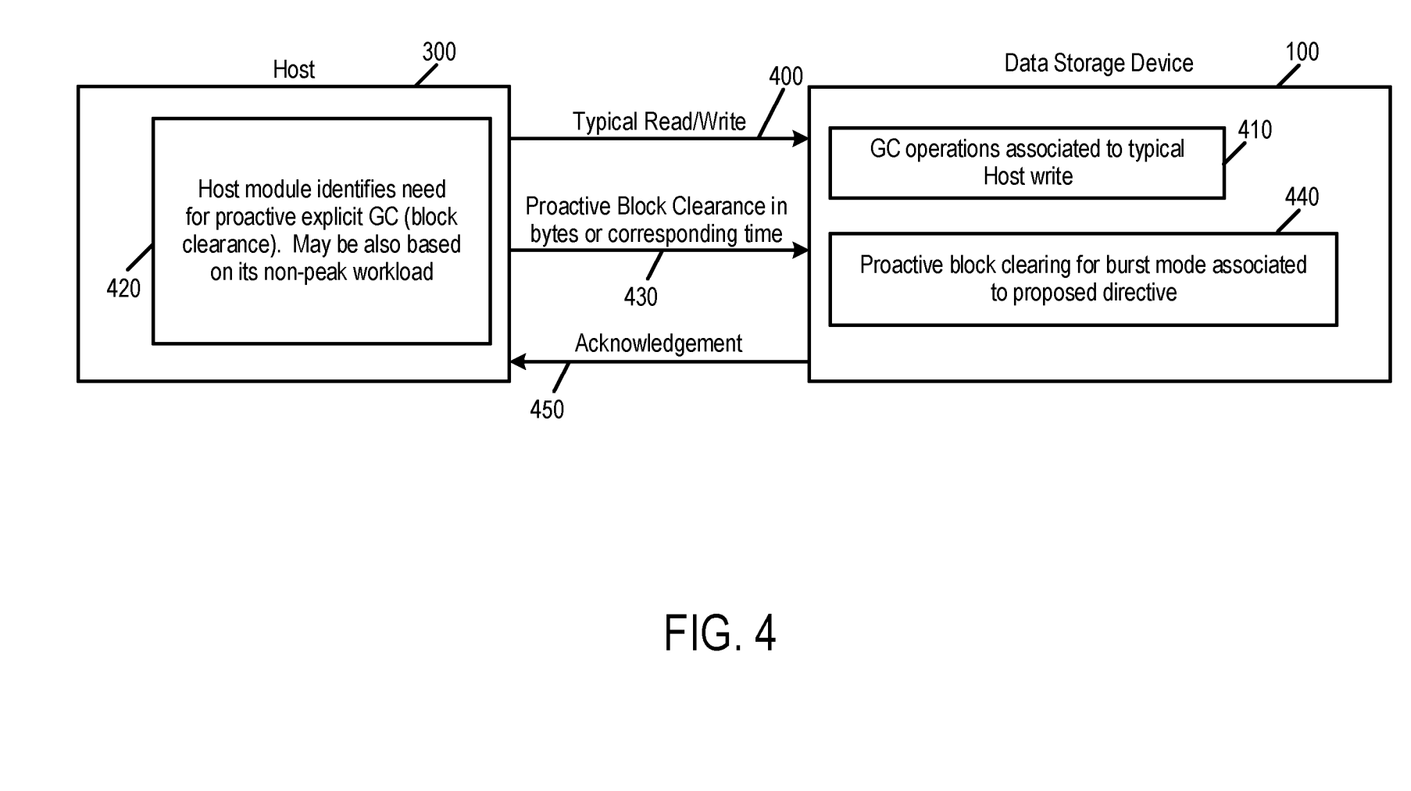
FIG. 4 is a block diagram of a host and data storage device of an embodiment.

FIG. 4 illustrates some of these concepts. As shown in FIG. 4, the host 300 can send typical read/write commands (act 400) to the data storage device 100. During the processing of such commands, the controller 102 in the data storage device 100 can perform garbage collection operations associated with a typical host write (act 410). However, in this embodiment, the host 300 can identify a need for proactive, explicit garbage collection (sometimes referred to herein as block release or clearance). This can also be based on the host's non-peak workload (act 420). The host 300 would then send the proactive block clearance command, which can specify a desired storage space to clear (e.g., in bytes or a burst time) (act 430). In response to this, the controller 102 in the data storage device 100 can perform proactive block clearing for a burst mode associated with the proposed directive (act 440). The data storage device 100 can send an acknowledgement to the host 300 after that has been completed (act 450), so the host 300 can commence the burst operation.

Based on timeout in the product specification, the data storage device 100 can clear blocks honoring timeouts. Similarly, based on the free block count marked for burst performance, the data storage device 100 may ignore the directive in some cases on determining that the consolidated requests are more than the acceptable product threshold.

The host 300/host processor 330 can implement the above functions in any suitable way. In one embodiment, the host 300 comprises a state machine or module that not only manages storage read/writes but also works in association with various applications and determines which applications need burst read/write in the immediate future. For example, in a gaming application, the end of one of the game stages may result in a quick flush of some data (say stage 1) and a reload of other data (say associated with stage 2) in a quick time. The module may trigger the proposed directive when it determines a near end of stage 1 itself to buy more time for the data storage device 100. The data storage device 100 accordingly keeps enough margin of blocks because of this directive. A proactive garbage collection is better than performing garbage collection after the burst mode (as is typically done) if the host 300 can determine a use case scenario proactively. The directive may also be called "block clear" for the same reason. It is the responsibility of this module to provide enough time to the data storage device (with power) for such clearance.

Figure 5:
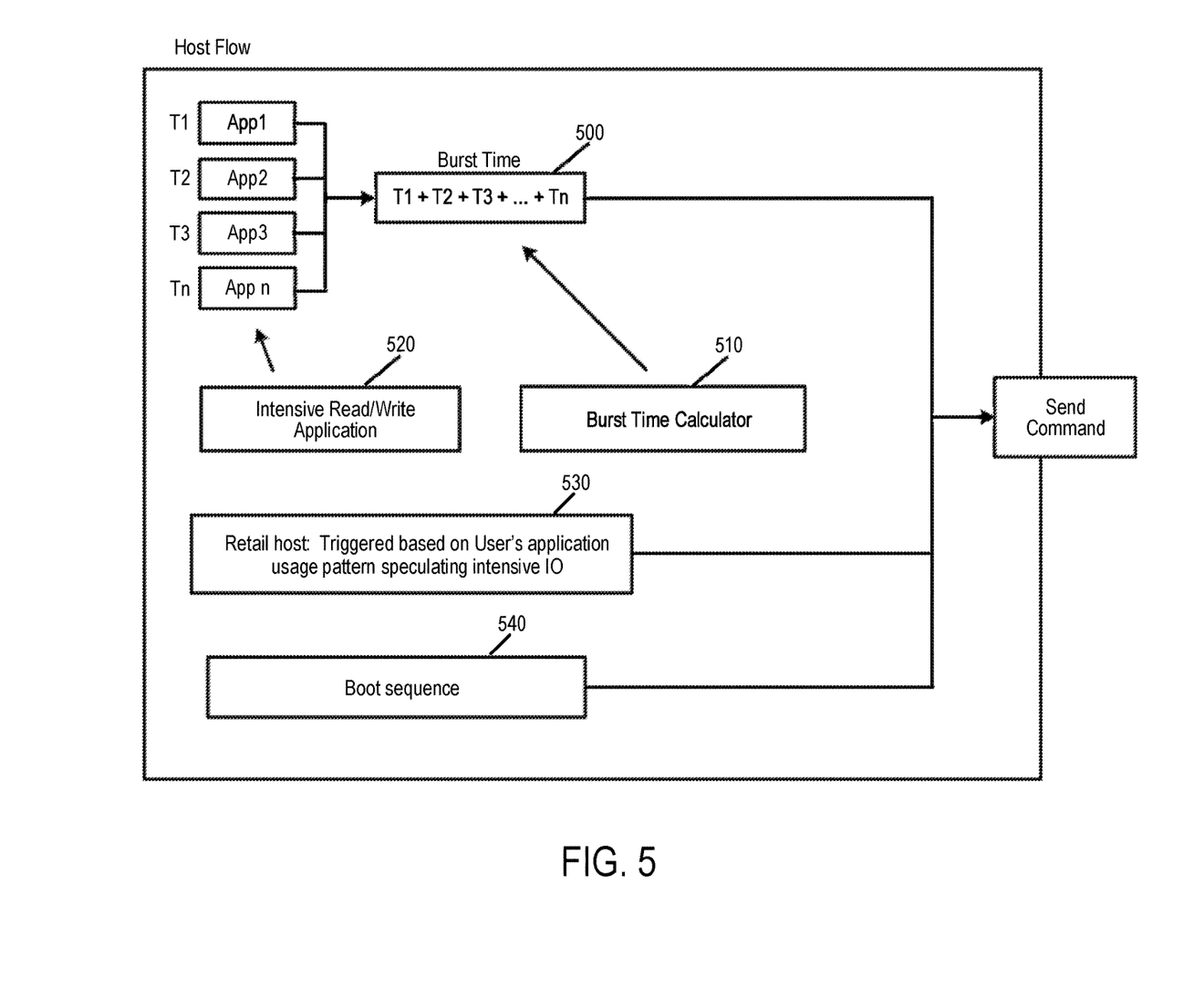
FIG. 5 is a host flow diagram of an embodiment.

FIG. 5 illustrates some example instances when the host 300 can decide that it needs to send the clearance command. As shown in FIG. 5, when multiple intense read/write applications (App1, App2, App3, App n) 520 want to keep writing a lot of data in bursts, a burst time calculator 510 calculates the total burst time 500, and the storage driver may consolidate and decide to send this command anticipating this requirement. This command may also be sent during the host boot up sequence 540 (e.g., where the option is made available in the host's operating system), so that the storage space of the data storage device 100 is in an optimized state, and minimal throttling (lesser background operations) would be observed for the current active session. In a retail environment, the host 300 may also determine the need based on the user's application usage pattern, speculating I/O bursts (act 520).

With advent of new technologies like graphics processor unit (GPU)-Direct storage (which will have wide range applications in gaming and deep-learning model training), there is a design to reduce bottlenecks due to load times between the CPU, RAM, the storage device, and the GPU video RAM (VRAM). The GPU will directly access the storage device for any/all computations. Since GPUs do batch-wise processing, any small throttling from storage (e.g., any drop in IOPS due to storage device throttling) will reflect in a marginal decrease in "system" performance. The master can use the proposed method as a preconditioner during lean times, so that the system running into throttling state due to BKOPs is reduced considerably.

Figure 6:
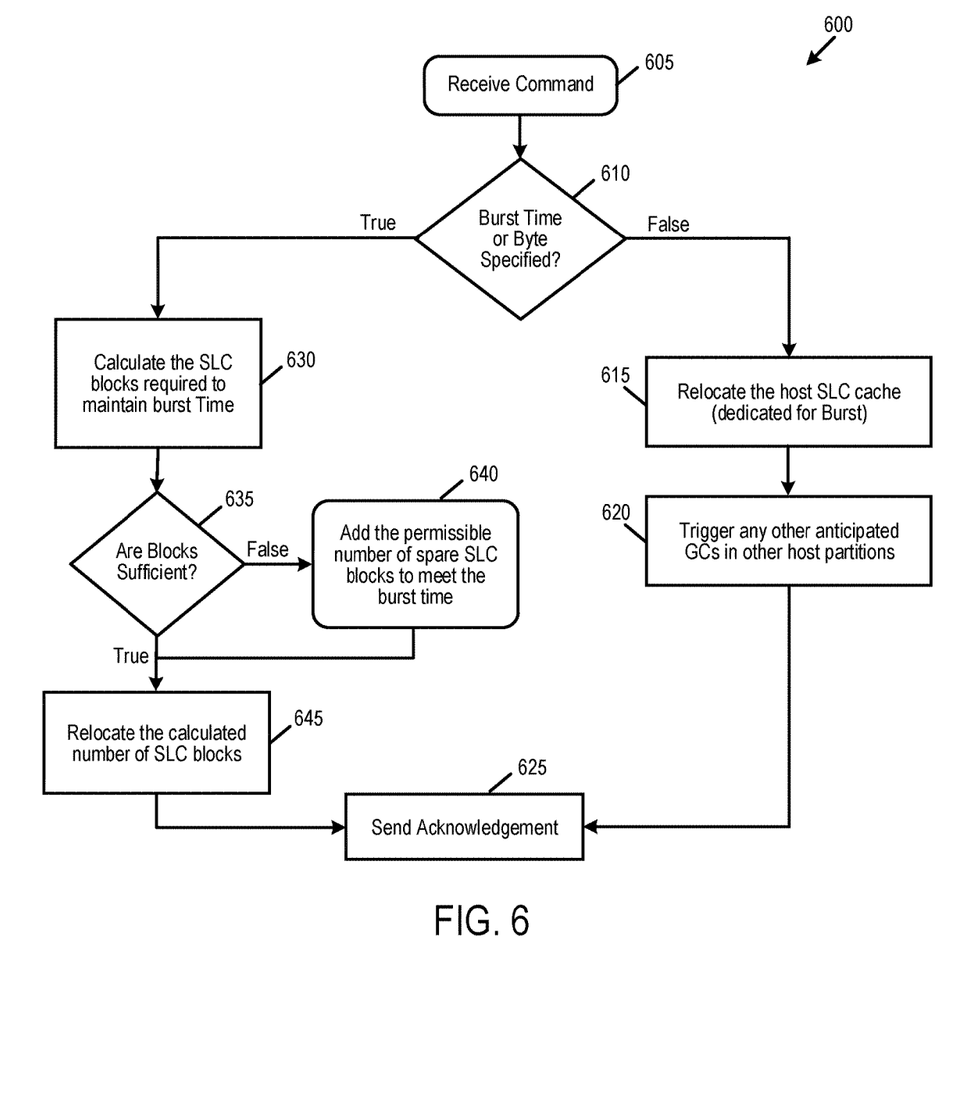
FIG. 6 is a flow chart of a method of an embodiment for host-determined proactive block clearance.

FIG. 6 is a flow chart 600 of a method of an embodiment for host-determined proactive block clearance. As shown in FIG. 6, when the controller 102 of the data storage device 100 receives a command from the host 300 (act 605), it determines if the command specifies a block clearance parameter, such as burst time or an amount of storage space (e.g., in bytes) that is required for an upcoming burst mode (act 610). If the command does not specify such a parameter, the controller 102 relocates the host SLC cache that is dedicated for burst mode (act 615) and triggers any other anticipated garbage collection operations in other host partitions (act 620). However, if the controller 102 determines that the command specifies a block clearance parameter, the controller 102 calculates the SLC blocks required to maintain burst time (act 630). The controller 102 then determines whether the current number of blocks in the SLC cache are sufficient to meet the requirement (act 635). If it is sufficient, the controller 102 relocates the calculated number of SLC blocks (act 645) and sends an acknowledgement to the host 300 (act 625). If it is not sufficient, the controller 102 adds the permissible number of spare SLC blocks to meet the burst time requirement, then relocates the calculated number of SLC blocks (act 645) and sends an acknowledgement to the host 300 (act 625)

There are many alternatives that can be used with these embodiments. For example, even though the above example was used to proactively free-up the SLC cache, if timeout conditions can be relaxed, the same can be applied for other garbage collection operations in the data storage device 100 (e.g., pre-schedule any anticipated garbage collection operations so that when the application wants to run something IO-intensive, it can be guaranteed that the data storage device's quality of service (QOS) will not decrease due to the garbage collection operations.

Also, in some cases, alongside the state machine, the host logic can decide on the directive based on the workload shared by the data storage device, for example, by determining various device-side workload heads up and sharing them with the host 300 on command processing latency. The possible burst range can be just another parameter sent to the host 300. In one example, the host logic may decide against triggering the proposed directive on determining that the data storage device 100 already has sufficient burst range required by the running applications. Further, the block clearance command functionality can be embedded in the host 300, which would give it enough freedom to send this command at any point it thinks best (e.g., after boot-up, before running anything IO-intensive, etc.).

There are several advantages associated with these embodiments. For example, with these embodiments, the data storage device 100 can enter an optimized state so that there will not be any garbage collection operations scheduled for quite some time. This method mostly revolves around using the burst buffer present in the data storage device 100 as efficiently as possible. In already-existing methods, the burst buffer, once full, will be used only with burst clean-up garbage collection operations, freeing-up the first blocks in the background, which would not be a "true burst." Further, when playing highly graphic-intensive games, this command can be used as a pre-requisite during a lean period, so that constant throughput can be achieved during the gaming session.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a processor configured to:
  inform a host of a workload of the data storage device;
  determine whether a command received from the host specifies a parameter of an upcoming burst mode, wherein the host is configured to specify the parameter in response to determining, based on the workload, that the data storage device will not provide a sufficient burst range required by the host;
  in response to determining that the command does not specify the parameter of the upcoming burst mode:
    relocate data stored in single-level cell (SLC) blocks dedicated for burst mode; and
    perform a garbage collection operation;
  in response to determining that the command does specify the parameter of the upcoming burst mode:
    determine whether an available number of SLC blocks is sufficient to satisfy the parameter of the upcoming burst mode;
    in response to determining that the available number of SLC blocks is sufficient, relocate data stored in the available number of SLC blocks;
    in response to determining that the available number of SLC blocks is not sufficient:
      add spare SLC blocks to the available number of SLC blocks to satisfy the parameter of the upcoming burst mode; and
      relocate data stored in the available and added numbers of SLC blocks; and
  in response to receiving an explicit host directive:
    clean-up logical-to-physical address delta data; and
    flush a logical-to-physical address cache to clear the logical-to-physical address cache for the upcoming burst mode.

2. The data storage device of claim 1, wherein:
the parameter comprises a length of time of the upcoming burst mode.

3. The data storage device of claim 1, wherein the parameter specifies a number of SLC blocks.

4. The data storage device of claim 1, wherein power to the data storage device is guaranteed by the host for an amount of time needed to perform the garbage collection operation.

5. The data storage device of claim 1, wherein the processor is further configured to perform the garbage collection operation in response to determining that the memory does not have enough available space.

6. The data storage device of claim 1, wherein the memory comprises a three-dimensional memory.

7. A method comprising:
  performing the following in a data storage device comprising a memory:
    informing a host of a workload of the data storage device;
    determining whether a command received from the host specifies a parameter of an upcoming burst mode, wherein the host is configured to specify the parameter in response to determining, based on the workload, that the data storage device will not provide a sufficient burst range required by the host;
    in response to determining that the command does not specify the parameter of the upcoming burst mode:
      relocating data stored in single-level cell (SLC) blocks dedicated for burst mode; and
      performing a garbage collection operation;
    in response to determining that the command does specify the parameter of the upcoming burst mode:
      determining whether an available number of SLC blocks is sufficient to satisfy the parameter of the upcoming burst mode;
      in response to determining that the available number of SLC blocks is sufficient, relocating data stored in the available number of SLC blocks;
      in response to determining that the available number of SLC blocks is not sufficient:
        adding spare SLC blocks to the available number of SLC blocks to satisfy the parameter of the upcoming burst mode; and
        relocating data stored in the available and added numbers of SLC blocks; and
    in response to receiving an explicit host directive:
      cleaning-up logical-to-physical address delta data; and
      flushing a logical-to-physical address cache to clear the logical-to-physical address cache for the upcoming burst mode.

8. The method of claim 7, wherein the command specifies a duration of time of the burst mode.

9. The method of claim 8, wherein the duration of time is determined from a plurality of expected burst times from a plurality of applications running on the host.

10. The method of claim 8, wherein the duration of time is determined from an application usage pattern.

11. The method of claim 8, wherein the duration of time comprises expected boot sequence time.

12. The method of claim 7, wherein the parameter of the upcoming burst mode comprises an amount of available storage space that needs to be created.

13. The method of claim 12, further comprising calculating the amount of available storage space that needs to be created from a duration of time of the burst mode.

14. The method of claim 7, wherein the command is received during a non-peak workload.

15. The method of claim 7, wherein the host guarantees power to the data storage device for an amount of time.

16. The method of claim 7, wherein the command is received prior to a transition from one stage to another stage in a game application.

17. A data storage device comprising:
  a memory; and
  means for:
    informing a host of a workload of the data storage device;
    determining whether a command received from the host specifies a parameter of an upcoming burst mode, wherein the host is configured to specify the parameter in response to determining, based on the workload, that the data storage device will not provide a sufficient burst range required by the host;
    in response to determining that the command does not specify the parameter of the upcoming burst mode:
      relocating data stored in single-level cell (SLC) blocks dedicated for burst mode; and
      performing a garbage collection operation;
    in response to determining that the command does specify the parameter of the upcoming burst mode:
      determining whether an available number of SLC blocks is sufficient to satisfy the parameter of the upcoming burst mode;
      in response to determining that the available number of SLC blocks is sufficient, relocating data stored in the available number of SLC blocks;
      in response to determining that the available number of SLC blocks is not sufficient:
        adding spare SLC blocks to the available number of SLC blocks to satisfy the parameter of the upcoming burst mode; and
        relocating data stored in the available and added numbers of SLC blocks; and
    in response to receiving an explicit host directive:
      cleaning-up logical-to-physical address delta data; and
      flushing a logical-to-physical address cache to clear the logical-to-physical address cache for the upcoming burst mode.

18. The data storage device of claim 2, wherein the processor is further configured to convert the length of time into a number of SLC blocks.

* * * * *